US008451595B2

(12) United States Patent
Leung et al.

(10) Patent No.: US 8,451,595 B2
(45) Date of Patent: May 28, 2013

(54) MOBILE DEVICE WITH A CONCEALED KEYBOARD

(75) Inventors: Chris Kwok Ching Leung, Richmond Hill (CA); Archer Chi Kwong Wun, Maple (CA)

(73) Assignee: Research In Motion Limited, Waterloo (CA)

( * ) Notice: Subject to any disclaimer, the term of this patent is extended or adjusted under 35 U.S.C. 154(b) by 154 days.

(21) Appl. No.: 13/035,421

(22) Filed: Feb. 25, 2011

(65) Prior Publication Data
US 2012/0218699 A1  Aug. 30, 2012

(51) Int. Cl.
*G06F 1/16* (2006.01)
(52) U.S. Cl.
USPC ............ 361/679.13; 361/679.09; 361/679.21; 361/679.59; 345/168; 312/223.1; 312/223.2
(58) Field of Classification Search
USPC ..................................................... 361/679.13
See application file for complete search history.

(56) References Cited

U.S. PATENT DOCUMENTS

| | | | |
|---|---|---|---|
| 6,219,681 B1 | 4/2001 | Hawkins et al. | |
| 6,430,038 B1* | 8/2002 | Helot et al. | 361/679.05 |
| 6,700,774 B2* | 3/2004 | Chien et al. | 361/679.2 |
| 6,700,775 B1 | 3/2004 | Chuang et al. | |
| 6,768,635 B2* | 7/2004 | Lai et al. | 361/679.11 |
| 6,882,524 B2 | 4/2005 | Ulla et al. | |
| 8,231,099 B2* | 7/2012 | Chen | 248/688 |
| 2004/0056843 A1* | 3/2004 | Lin et al. | 345/168 |
| 2005/0052831 A1* | 3/2005 | Chen | 361/680 |
| 2005/0227635 A1 | 10/2005 | Hawkins | |
| 2006/0018102 A1 | 1/2006 | Soderlund | |
| 2009/0001232 A1 | 1/2009 | Seo et al. | |

FOREIGN PATENT DOCUMENTS

WO    0231807 A1    4/2002

OTHER PUBLICATIONS

Extended European Search Report dated Jul. 28, 2011. In corresponding application No. 11156077.7.
http://www.core77.com/blog/object_culture/kyoceras_flexible_folding_phone_concept_13184.asp Retrieved Apr. 14, 2009.
http://arstechnica.com/hardware/news/2009/01/n810-wimax-edition-pulled-by-nokia.ars , Published Jan. 2009.
http://en.wikipedia.org/wiki/Nokia_N810. Retrieved Nov. 2, 2011.

* cited by examiner

*Primary Examiner* — Anthony Q Edwards
(74) *Attorney, Agent, or Firm* — Fitch, Even, Tabin & Flannery LLP

(57) ABSTRACT

An electronic device having a concealed keyboard includes a first housing, a second housing rotatably coupled to the first housing, and a concealment cover coupled to a rear of the first housing. The first housing has a coupling edge and two sides that are substantially perpendicular to the coupling edge of the first housing. The second housing has a coupling edge and two sides that are substantially perpendicular to the coupling edge of the second housing. A receiving portion is formed on a rear surface of the first housing and is configured to receive the second housing. When the second housing is in the receiving portion, each respective side of the first housing and the second housing are co-terminal with one another. The concealment cover is exteriorly positioned with respect to the second housing when the second housing is in the receiving portion.

20 Claims, 6 Drawing Sheets

# MOBILE DEVICE WITH A CONCEALED KEYBOARD

FIELD OF TECHNOLOGY

The present disclosure relates generally to mobile devices. More specifically, the present disclosure relates to mobile devices having a concealed keyboard.

BACKGROUND

With the advent of more robust electronic systems, advancements of mobile devices are becoming more prevalent. Mobile devices can provide a variety of functions including, for example, telephonic, audio/video, and gaming functions. Mobile devices can include mobile stations such as cellular telephones, smart telephones, portable gaming systems, portable audio and video players, electronic writing or typing tablets, mobile messaging devices, personal digital assistants, and handheld computers.

BRIEF DESCRIPTION OF THE DRAWINGS

Implementations of the present application will now be described, by way of example only, with reference to the attached Figures, wherein.

DETAILED DESCRIPTION

Figure 1:
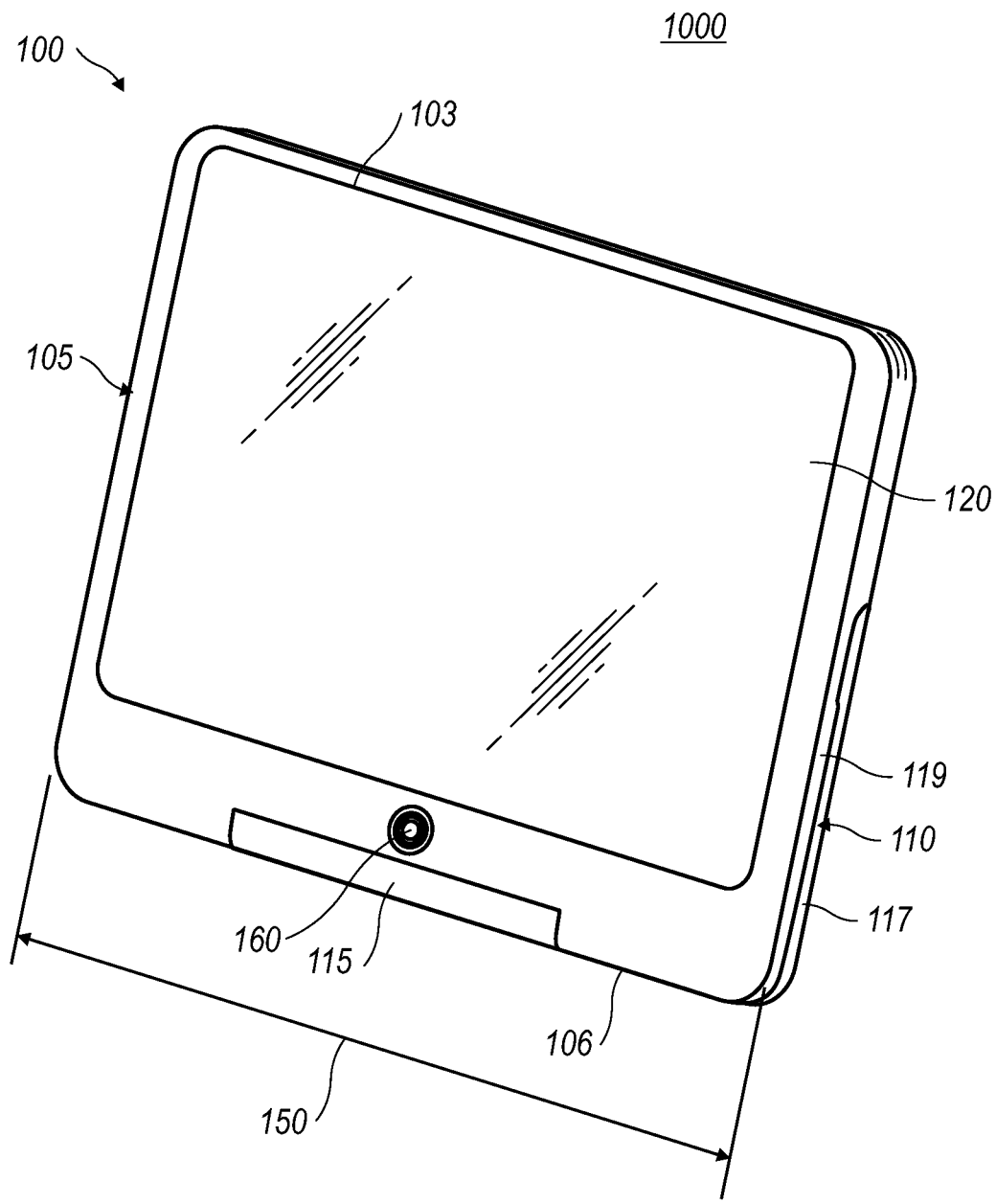
FIG. 1 is a perspective view of the front of an exemplary device having a concealed keyboard in accordance with an exemplary implementation in a first configuration.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this document will now be presented. The word "coupled" is defined as connected, whether directly or indirectly through intervening components and is not necessarily limited to physical connections. The term "electronic device" is defined as any electronic device that is capable of at least accepting information entries or commands from a user and includes its own power source. The term "concealed" is defined as being at least partially concealed, including fully concealed.

The following figures describe an electronic device having a concealed keyboard. With the electronic device having a concealed keyboard described herein, the size of the electronic device need not be comprised as the functionalities of the electronic device and user interfaces advance. While the following description describes an electronic device having a concealed keyboard where the electronic device is an electronic pad, one of ordinary skill in the art will appreciate that the electronic device can be a computer tablet, a mobile device, a communication device, a handheld computing device, a netbook, a personal digital assistant (PDA), a handheld video gaming system, a messaging device, or any other electronic device that can utilize a keyboard, or any other switch panel manipulable to enter inputs to the electronic device.

An electronic device having a concealed keyboard can include: a first housing, a second housing rotatably coupled to the first housing, and a concealment cover coupled to the rear of the first housing. The first housing can include a coupling edge and two sides that are substantially perpendicular to the coupling edge of the first housing. Similarly, the second housing can include a coupling edge and two sides that are substantially perpendicular to the coupling edge of the second housing. The second housing can be rotatably coupled to the first housing such that the coupling edge of the second housing is coupled to the coupling edge of the first housing. In one implementation, the first housing can house a display screen, and the second housing can house a keyboard. A receiving portion can be formed on a rear surface of the first housing and can be configured to receive the second housing. When the second housing is received in the receiving portion, each respective side of the first housing and the second housing are co-terminal with one another. The concealment cover can be exteriorly positioned with respect to the second housing when the second housing is received in the receiving portion.

Other configurations and arrangements will be described below in relation to the illustrated implementations. One of ordinary skill would appreciate that the elements from the illustrated implementations can be optionally included and arranged in various combinations to achieve the described benefits of the presently disclosed electronic device having a concealed keyboard.

FIG. 1 is a perspective view of the front of an exemplary electronic device 100 having a concealed keyboard in a first configuration 1000. FIG. 1 illustrates that a first housing 105 can include a front face 103, a coupling edge 106, and two sides 119. The two sides 119 are substantially perpendicular to the coupling edge 106. Additionally, the first housing 105 has a first length 150. For example, the first length 150 can be measure along the coupling edge 106.

FIG. 1 illustrates the first configuration 1000 of the electronic device 100 having a concealed keyboard. As illustrated, the first configuration 1000 is a closed configuration or a closed-position. In the first configuration 1000, at least a portion of the second housing 110 is concealed. In the first configuration 1000, the second housing 110 can be positioned against a rear surface (not shown) of the first housing 105. As illustrated in FIG. 1, the second housing 110 includes a side 117. In particular, in FIG. 1, the second housing 110 has two sides 117 that are substantially perpendicular to the coupling edge (not shown) of the second housing 110. The side 117 is co-terminal with the side 119 of the first housing 105 when the second housing 110 is positioned against the rear surface of the first housing 105. Further details as to the co-terminal relationship between the respective sides 119, 117 of the first housing 105 and the second housing 110 will be described in further detail below. In the illustrated implementation of FIG. 1, the sides 117 of the second housing 110 and the sides 119 of the first housing 105 are co-terminal such that the sides 117 and the sides 119 are flush with each other. As illustrated in FIG. 1, the sides 117 of the second housing 110 are co-terminal with the sides 119 of the first housing 105 such that the sides 117 of the second housing 110 form a portion of the exterior perimeter of the electronic device 100. For example, the sides 117 of the second housing 110 are aligned with the sides 119 of the first housing 105 to provide the appearance that the second housing 110 is a part of the first housing 105, when the electronic device is in the first configuration 1000.

In FIG. 1, a coupler 115 couples the first housing 105 to the second housing 110. In at least one implementation the coupler 115 couples the coupling edge 112 (shown in FIG. 2) of the second housing 110 to the coupling edge 106 of the first housing 105. In FIG. 1, the first housing 105 and the second housing 110 are rotatably coupled to one another. In the illustrated implementation of FIG. 1, the coupler 115 is a hinge but the coupler 115 can be a double-pinned hinge, a rotatable attachment mechanism, a pivoting attachment mechanism, or any other coupling mechanism that allows the second housing 110 to be rotatable with respect to the coupling edge 106 of the first housing 105.

In at least one exemplary implementation, such as illustrated in FIG. 1, the first housing 105 can house a display screen 120. The display screen 120 is a touch-sensitive display; however, the display screen 120 can be a lighted display screen, an LCD screen, a light emitting diode (LED) screen, an active matrix organic light emitting diode (AMOLED) screen, an organic light emitting diode (OLED) screen, or any other type of display screen on which textual or graphical content can be displayed.

The second housing 110 can house the keyboard (not shown). As illustrated in FIG. 1, the electronic device 100 is in the first configuration 1000. In at least one implementation, the keyboard of second housing 110 can be concealed in the first configuration. In another implementation, the keyboard of the second housing 110 can be oriented with respect to the first housing 105 such that only the display screen 120 is accessible for operation by a user.

In yet another exemplary implementation, the electronic components of the electronic device 100 can be housed in the first housing 105. For example, a circuit board (not shown) and a battery (not shown) can be housed in the first housing 105. The circuit board can be communicatively coupled to the display screen 120 and the keyboard (shown in FIG. 3). Also, the battery (not shown) can be housed in the first housing 105. The battery can be communicatively coupled to the display screen 120, thereby providing a power source for the display screen 120. In other implementations, other electronic components, such as a camera 160, electronic coupling wires, a microprocessor, or other components that allow the electronic device 100 to operate and function can be housed in the first housing 105. In such implementations having the electronic components housed in the first housing 105, more electronic signal lines are required to couple the display screen 120 to the electronic components to allow the display screen and the electronic device to function than are required to allow the keyboard to function. Therefore, by housing the electronic components in the first housing, the electronic components can be housed together, thereby efficiently utilizing the space within the first housing 105 and second housing 110 of the electronic device 100. Additionally, housing electronic components that operate in conjunction with the display screen 120 in the same housing (e.g., the first housing 105) can enhance the functionality of the electronic components as signals sent and received between the display screen 120 and the electronic components need not travel across the coupler 115.

Figure 2:
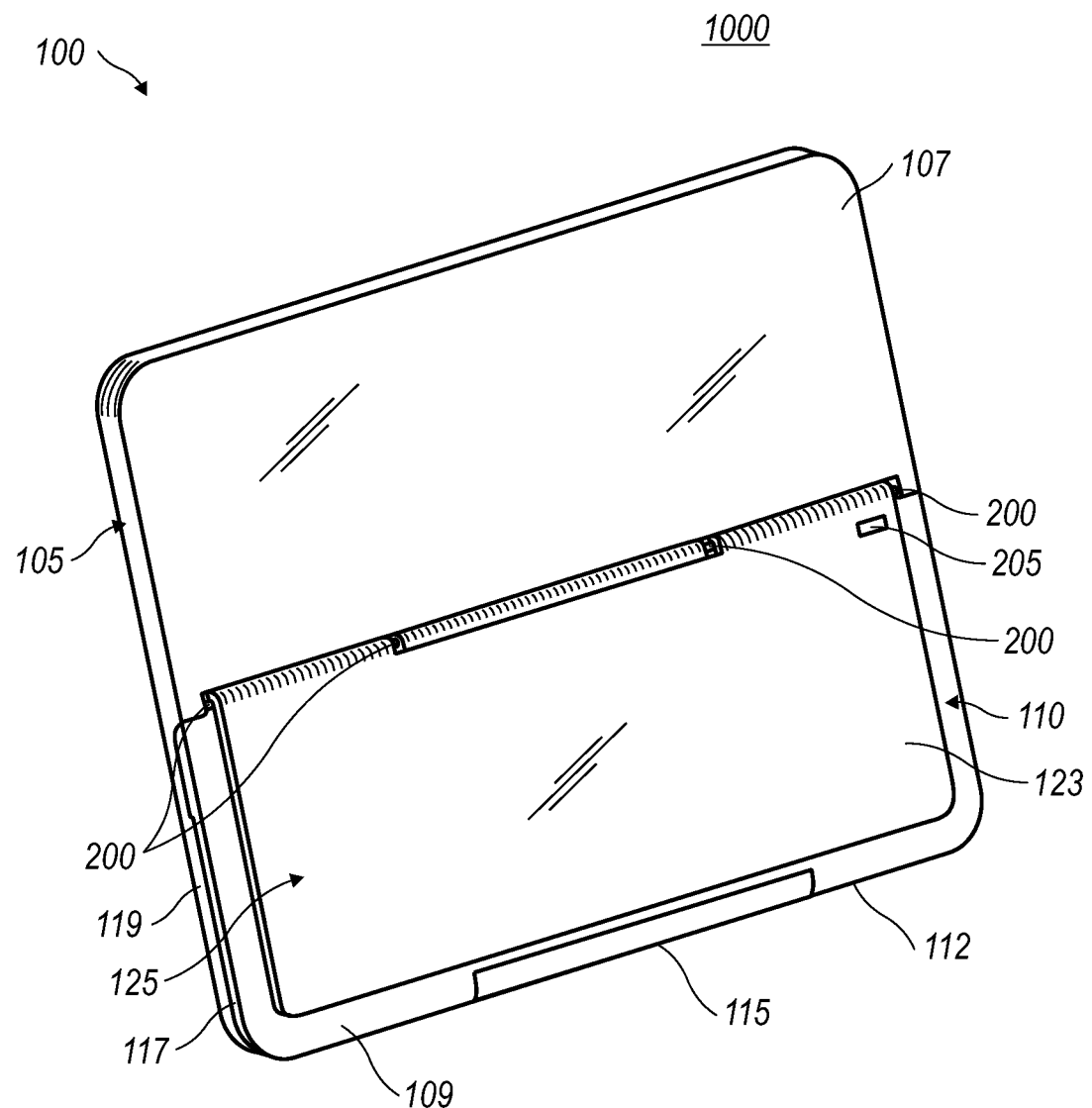
FIG. 2 is a perspective view of the back of the exemplary device illustrated in FIG. 1 in the first configuration.

FIG. 2 illustrates the concealment of the second housing 110 when the electronic device 100 is placed in the first configuration 1000. FIG. 2 illustrates a rear surface 107 of the first housing 105. A concealment cover 125 is coupled to the rear surface 107. A receiving portion (shown in FIG. 6) is formed in the rear surface 107. The receiving portion is configured to receive the second housing 110, for example in the first configuration 1000. As illustrated in FIG. 2, the second housing 110 has been received in the receiving portion, and the concealment cover 125 is positioned exteriorly to the second housing 110. The concealment cover 125 conceals at least a portion of the second housing 110 when the electronic device is in the first configuration 1000. For example, in FIG. 2, a front 109 of the second housing 110 is concealed by the concealment cover 125. Also, when the second housing 110 is received in the receiving portion of the first housing 105, a rear 111 (shown in FIG. 3) of the second housing 110 faces the rear surface 107 of the first housing 105. Additionally, the front 109 of the second housing faces a back 127 (shown in FIG. 5) of the concealment cover 125 and at least a portion of the front 109 of the second housing 110 is covered by the concealment cover 125. Concealing a portion of the second housing 110 can protect the internal portion of the second housing 110 from foreign matter entering therein. Additionally, concealing a portion of the second housing 110 can protect the portion from scratches, dents, scuffs or other markings that could damage or alter the appearance of the second housing 110. In implementations where a portion, and not all, of the second housing 110 is concealed, the concealment cover 125 will not sufficiently alter or add to the overall thickness of the electronic device 100. Additionally, by covering a portion, and not all, of the second housing 110 the second housing 110 can have substantially the same length as the first housing 105 but still be concealed in the first configuration 1000.

In at least one implementation, the second housing 110 can have a keyboard 305 (shown in FIG. 3) exposed at the front 109 of the second housing 110. Therefore, in such an implementation, the portion of the second housing 110 having the keyboard 305 will be concealed by the concealment cover 125 in the first configuration 1000 and can be exposed in a second configuration 2000 (shown in FIG. 3). For example, in the first configuration 1000, the keyboard can be substantially covered by the concealment cover 125. In particular, the keys of the keyboard can be substantially covered by the concealment cover 125, thereby protecting the keyboard from debris, moisture, and dirt and reducing the likelihood of inadvertent actuations of the keys of the keyboard when the electronic device 100 is carried in the hands of the user, stored in a compartment or in baggage, or placed on a surface in the first configuration 1000 such that the rear surface 107 of the electronic device 100 is resting on the surface. Additionally, as illustrated in FIG. 2, the concealment cover 125 is substantially parallel with the rear surface 107 of the first housing 105. In at least on implementation, the concealment cover 125 can be substantially flush with the rear surface 107 when the electronic device is in the first configuration 1000.

As illustrated in FIG. 2, the concealment cover 125 is a plate. However in other implementations, the concealment cover 125 can be a flap, a door, or any other cover that can conceal a portion of the second housing 110 when the electronic device 100 is in the first configuration 1000. In FIG. 2, the concealment cover 125 is hingedly coupled to the rear surface 107 of the first housing 110. For example, the concealment cover 125 can be coupled to the rear surface 107 by a hinge, a double-pinned hinge, a bracket, a spring-biasing mechanism, or any other coupling mechanism that hingedly couples the concealment cover 125 to the rear surface 125. In the implementation illustrated in FIG. 2, the concealment cover 125 is coupled to the rear surface 107 at four coupling attachment points 200 formed on the rear surface 107. Further details as to the attachment of the concealment cover 125 will be described in relation to FIG. 6.

Additionally, in at least one implementation, the electronic device 100 can include a lock 205, shown in FIG. 2. The lock 205 can secure the concealment cover 125 against the second housing 110, thereby securing the second housing 110 within the receiving portion of the first housing 105. While the illustrated implementation shows the lock 205 on an outer surface 123 of the concealment cover 125, the lock 205 can be placed on other portions of the electronic device 100 that allows the second housing 110 to be secured to the first housing 105 in the first configuration 1000. For example, the lock 205 can be placed on one or both of the sides 119 of the first housing 105, on one or both of the sides 117 of the second housing 110, on the front 109 of the second housing 110, on the coupling edge 106 of the first housing 105, on the coupling edge 112 of the second housing 112, or any other portion of the electronic device 100. Placing the lock 205 on an outer surface of the electronic device 100 provides accessibility to the lock 205. Also, placing the lock 205 on the outer surface of the electronic device 100 reduces interference of the lock 205 with other components of the electronic device 100.

Figure 3:
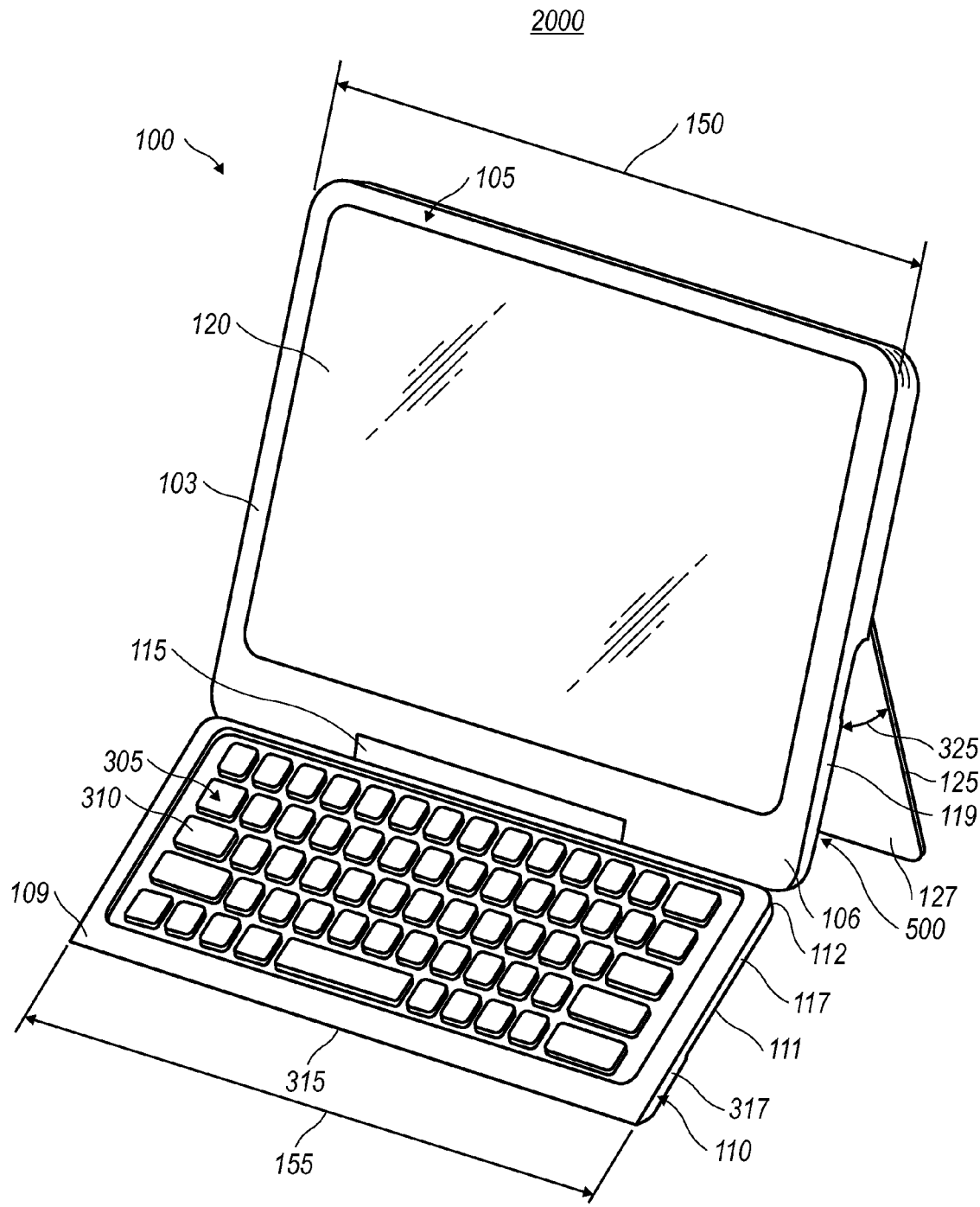
FIG. 3 is a perspective view of the front of the exemplary device illustrated in FIG. 1 in a second configuration.

FIG. 3 illustrates the second configuration 2000 of the electronic device 100. In FIG. 3, the second configuration 2000 is an open configuration or an open position but can also be any other configuration in which the second housing 110 is exposed from the receiving portion 500 of the first housing 105. As illustrated in FIG. 3, the front 109 of the second housing 110 houses the keyboard 305. The keyboard 305 can include a plurality of keys 310. The keys 310 can be depressible keys of a push-button or push-pad nature, whereby data can be input to the device when the keys are pressed. In the implementation in FIG. 3, the keys 310 are wired to the first housing 105. For example, the wire connections can be encased in the hinge 115. When the depressible keys 310 are actuated, the keys 310 can generate an input signal. The generated input signals then travel through the wires from the keyboard 305 through the hinge 115 and to the first or display housing 105. While the illustrated keyboard 305 shows active push-button or depressible keys 310, the keyboard 305 can include inactive dome switches and keycaps which do not generate signals to the mobile device 100. In other implementations, the keys 310 can be capacitive keys or touch-sensitive keys. In at least one implementation, the keys 310 can each have at least one of alphabetic, numeric, symbolic, or function indicia, whereby the indicia indicate or signify the data that can be input to the device when the corresponding key is pressed. In another implementation, the keys 310 can have a combination of alphabetic, numeric, symbolic, or function indicia. In yet another implementation, each key 310 can have more than one alphabetic indicia, more than one function indicia, more than one symbolic indicia, more than one numeric indicia, or any combination thereof. The illustrated implementation shows sixty-three keys 310 having twenty-six keys corresponding to alphabetic characters. However, one of ordinary skill in the art will appreciate that the keyboard 305 can have fewer than or more than sixty-three keys. For example, the keyboard 305 can have twenty keys corresponding to a reduced keyboard layout, where more than one alphabetic character is associated with at least one key.

Those of ordinary skill in the art will appreciate that additional keys can be included on the electronic device 100. For example, a navigation tool can be included on the second housing 110. Alternatively, the navigation tool can be included on the first housing 105. In another implementation, function keys can be included on the electronic device 100. For example, function keys can include volume control keys, a power key, a call-function key, a mute button, a trackpad, a trackwheel, navigation keys, cursor keys or other key that inputs a function rather than a data entry. In yet other implementations, the electronic device 100 can have a number of function keys which can include one or more of the above-described function keys.

As illustrated in FIG. 3, the electronic device 100 has been placed in the second configuration 2000 where the second housing 110 has been rotated about the respective coupling edges 106, 112 of the first housing 105 and second housing 110 such that the keyboard 305 is exposed and available for data entry. The concealment cover 125 has been rotated such that the concealment cover 125 forms an angle 325 with respect to the receiving portion 500 of the first housing 105. In FIG. 3, the angle 325 is an acute angle. For example, the angle 325 can be less than ninety (90) degrees. As the concealment cover 125 forms an acute angle with the first housing 105, a bottom edge of the concealment cover 125 can engage a surface, such as a table top, a user's lap, or any other surface, thereby propping or supporting the first housing 105 against the surface. For example, the concealment cover 125 can act as a stand for the first housing 105 when the electronic device 100 is in the second configuration 2000. As the first housing 105 is propped up by the concealment cover 125, the user can view the display screen 120 housed in the first housing 105 in a comfortable position. For example, the display screen 120 can be positioned at an appropriate angle, with respect to the concealment cover 125, that reduces strain on the user's neck and that provides a comfortable viewing angle for the user's eye level.

The second housing 110 including the keyboard 305 can rest on the surface to support the user's manipulations of the keyboard 305. For example, in the second configuration 2000, the electronic device 100 can operate similar to a portable computer, a desktop computer, or a laptop computer. For example, the user has the functionality of a physical keyboard 305, such as a full keyboard as illustrated, and a large display screen 120 that is neither obstructed by nor compromised in size by the size of the physical keyboard 305.

Additionally, the size and layout of the second housing 110 is illustrated in FIG. 3. The second housing 110 has a second length 155 along the coupling edge 112 of the second housing 110. As shown in FIG. 3, the second length 155 is substantially equal to the first length 150 of the first housing 105. While the illustrated implementation shows the first length 150 and the second length 155 being substantially equal, those of ordinary skill in the art will appreciate that the first length 150 and the second length 155 need not be substantially equal, for example, the first length 150 can be longer or shorter than the second length 155. However, in the exemplary implementation of FIG. 3, the first length 150 and the second length 155 are substantially equal in order to provide a full keyboard and large display in a second configuration 2000 while also providing a compact device in the first configuration 1000. For example, in the first configuration 1000, the user can operate the electronic device 100 as an electronic tablet whereby inputs and data entry can be made through manipulations of the touch-sensitive display 120 housed in the first housing 1000. In the second configuration 2000, the second housing 110 is exposed allowing the user to operate the electronic device 100 as a portable computer whereby inputs and data entry can be made through manipulations of the keyboard 305 housed in the second housing 110. In the second configuration 2000, the user has the functionality of the large physical keyboard 305 and the large display screen 120 that is familiar to the user.

The second housing 110 has a top edge 315 parallel and opposite to the coupling edge 112 (shown in FIG. 2) of the second housing 110. The top edge 315 can align with an edge 620 (shown in FIG. 6) of the rear surface 107 of the first housing 105 in the first configuration 1000. In at least one implementation, when the device 100 is placed in the first configuration 1000, the top edge 315 of the second housing 110 can be flush with the edge 620 of the first housing. In such an implementation, the rear surface 107 of the first housing 105 can be co-terminal with the front 109 of the second housing 110 in the first configuration 1000, thereby providing the concealment cover 125 to be exteriorly positioned on the second housing 110 such that the concealment cover is parallel with the rear surface 107 of the first housing 105. For example, the concealment cover 125 can be substantially flush with the rear surface 107.

In the implementation of FIG. 3, at least one of the sides 117 of the keyboard can have a protruding portion 317. The protruding portion 317 can place the top edge 315 of the second housing 110 at a height higher than the coupling edge of the 112 of the second housing 110 when the device 100 is placed in the second configuration 2000. For example, the protruding portion 317 can prop the top edge 315, which can correspond to the bottom of the keyboard 305, upwards with respect to a surface on which the device 100 is placed, thereby providing ergonomic support for a user when manipulating the keys 310 of the keyboard 305. Additionally, the protruding portion 317 can provide further securement of the second housing 110 to the first housing 105 when the electronic device is placed in the first configuration 1000. For example, as will be described in further detail in relation to FIG. 6, the protruding portion 317 of the second housing 110 can engage with a corresponding recess portion in the receiving portion 500 of the first housing 105. In at least one implementation, the protruding portion 317 can be formed from the same material as the remaining portion of the second housing 110. In another implementation, the protruding portion 317 can comprise a cushioning material. For example, the protruding portion 317 can comprise a foam or other semi-firm cushioning material. The cushioning material can be coupled (for example, adhered) to the bottom 111 of the second housing 110. In such an implementation, the protruding portion 317 can provide cushioning support for the user during the user's manipulations of the keys 310 of the keyboard 305 exposed at the front 109 of the second housing 110.

In another implementation, the bottom 111 of the second housing 110 can include a material that prevents the bottom 111 from slipping or moving along a surface on which the second housing 110 can rest in the second configuration 2000. For example, the material can be a slip-proof material, a rubber material, a foam material, or other similar materials that could assist in preventing the second housing 110 from moving along the surface. Additionally, it will be appreciated that such a material can be layered on a portion of or all of the bottom 111 of the second housing 110.

Figure 4:
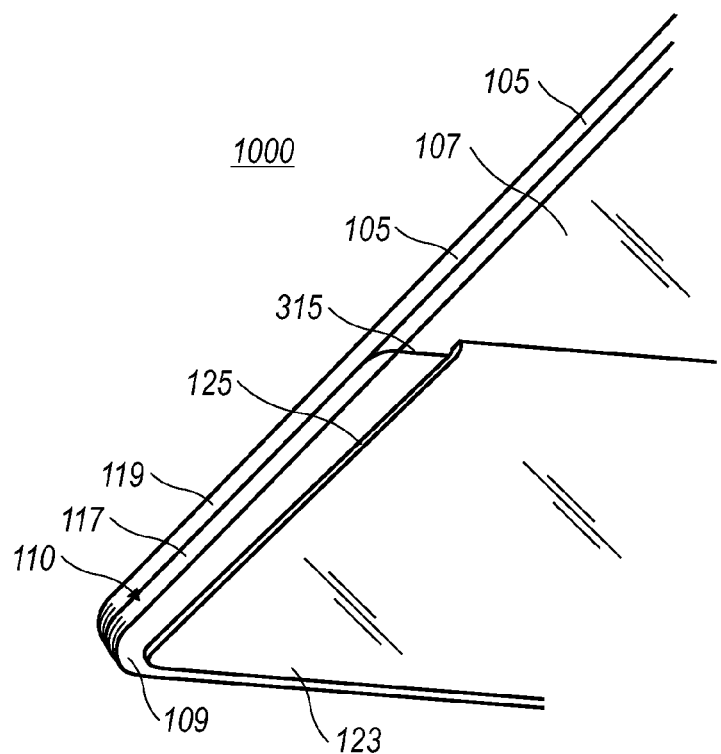
FIG. 4 is a partial back view of the exemplary device in the first configuration and illustrating the co-terminal sides of first and second housings.
Figure 5:
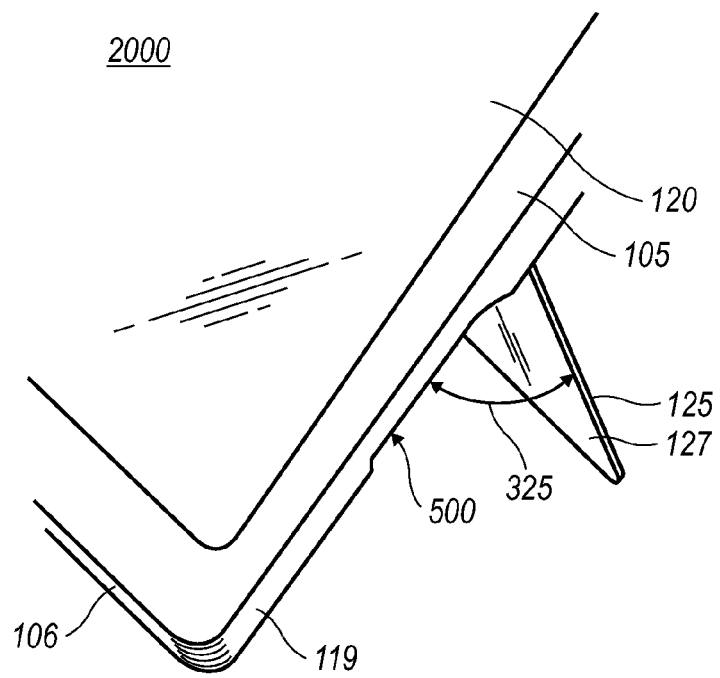
FIG. 5 is a partial side view of the first housing of the exemplary device positioned in the second configuration where the concealment cover can act as a stand.

FIGS. 4 and 5 are close-up illustrations of an exemplary electronic device according to the present technology illustrating the hingeablity of the concealment cover 125 with respect to the first housing 105. FIG. 4 illustrates the concealment cover 125 placed in the first configuration 1000. For example, as illustrated in FIG. 4, the concealment cover 125 is substantially parallel with the rear surface 107 of the first housing 105 and covers the front 109 of the second housing 110. In FIG. 5, the concealment cover 125 is placed in the second configuration 2000 such that the concealment cover 125 forms the angle 325 with respect to the receiving portion 500 formed in the rear surface 107 of the first housing 105. For example, in FIG. 5, the angle 325 formed is an acute angle.

For example, in the implementation illustrated in FIGS. 4 and 5, the maximum angle the concealment cover 125 can form with respect to the rear surface 107 can be sixty (60) degrees. It will be appreciated by those of skill in the art that the figures herein are not drawn to scale and are for illustrative purposes. As the maximum angle is sixty degrees, the spring biasing mechanism can bias the concealment cover 125 to the close position corresponding to the first configuration 1000 if the angel 325 formed with respect to the rear surface 107 of the first housing 105 is less than thirty (30) degrees (i.e., less than half of the maximum angle—sixty degrees). The spring biasing mechanism can bias the concealment cover 125 to the open position corresponding to the second configuration 2000 if the angle 325 formed with respect to the rear surface of the first housing 105 is greater than thirty (30) degrees. However, in other implementations, depending on the length of the concealment cover 125 and where on the rear surface of the first housing the concealment cover 125 is placed, the angle 325 formed can be an obtuse angle or a right angle, so long as the angle 325 formed allows the concealment cover 125 to support the first housing 105 against a surface when the electronic device is placed in the second configuration 2000.

For purposes of brevity and as FIGS. 4 and 5 have been included to illustrate the angle 325 formed by the concealment cover 125 in the second configuration 2000, the second housing 110 has not been illustrated in FIG. 5. However, those of ordinary skill in the art will appreciate that the electronic device 100 will have the second housing 110 rotatably coupled to the coupling edge 106 of the first housing 105.

In the exemplary implementation illustrated in FIGS. 4 and 5, the concealment cover 125 is spring-biased with respect to the rear surface 107 of the first housing 105. For example, a torsion spring can be coupled to a hinge that couples the concealment cover 125 to the rear surface 107 of the first housing 105, however other springs and spring-biasing mechanisms can be implemented. The concealment cover 125 can be spring biased between a closed position corresponding to the first configuration 1000 and an open position corresponding to the second configuration 2000. In the exemplary implementation of FIGS. 4 and 5, the concealment cover 125 can be biased to the closed position or the open position in dependence upon the angle 325 formed by the concealment cover 125 with the rear surface 107 of the first housing 105. In one implementation, the concealment cover 125 can form a maximum angle with respect to the first housing 105. For example, the maximum angle can be the largest angle that the concealment cover 125 can form with respect to the first housing 105 to support the first housing 105 against a surface. In such an implementation, the spring biasing mechanism can bias the concealment cover 125 to the closed position corresponding to the first configuration 1000 if the angle 325 formed with respect to the rear surface 107 of the first housing 105 is less than half of the maximum angle that the concealment cover 125 can form with respect to the rear surface 107. Similarly, the spring biasing mechanism can bias the concealment cover 125 to the open position corresponding to the second configuration 2000 if the angle 325 formed with respect to the rear surface 107 of the first housing 105 is greater than half of the maximum angle that the concealment cover 125 can form with respect to the rear surface 107.

Figure 6:
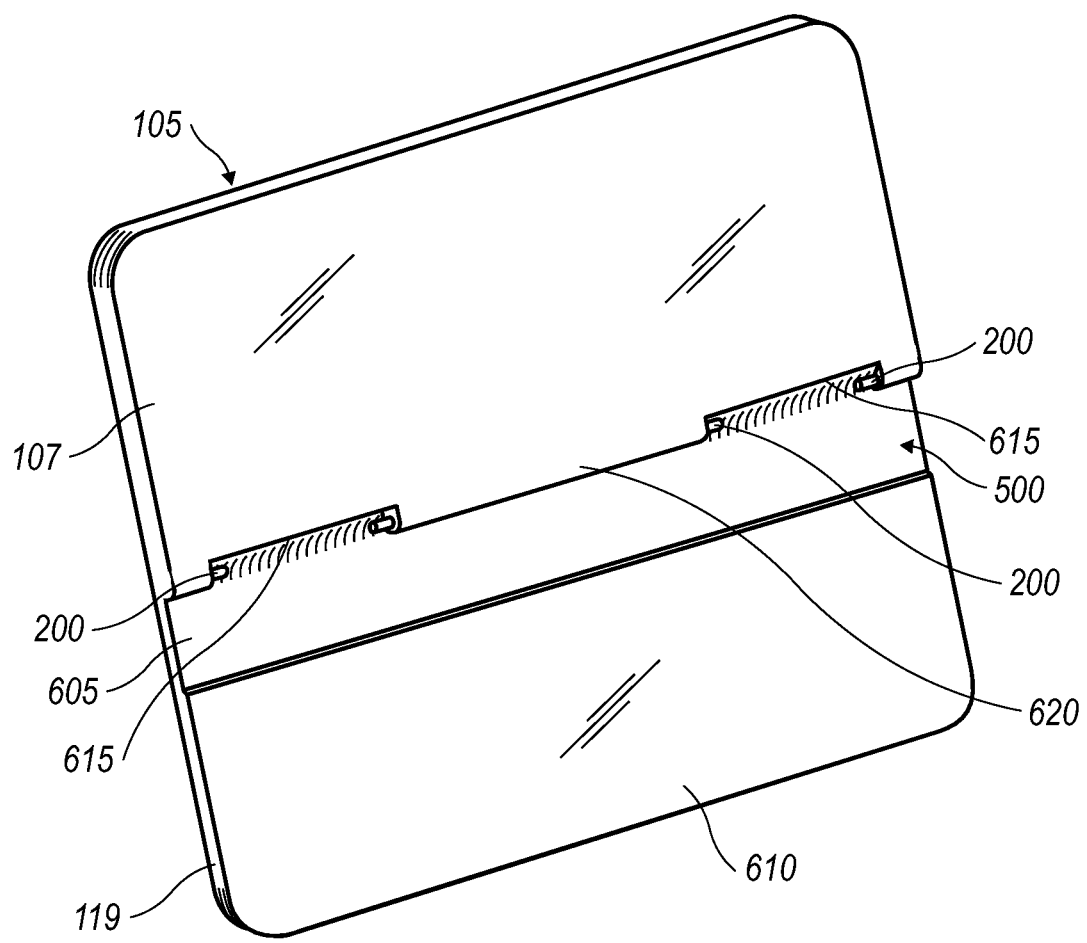
FIG. 6 is a perspective view of the back of the first housing of the exemplary device illustrating the attachment points for the concealment cover and the receiving portion for the second housing.

FIG. 6 is an illustration of the rear surface 107 of the first housing 105 of the electronic device 100 having a concealed keyboard of the present disclosure. As illustrated in FIG. 6, the receiving portion 500 is formed in a portion 610 of the rear surface 107. The receiving portion 500 is configured to receive the second housing 110 when the electronic device 100 is placed in the first configuration 1000. For example, the portion 610 of the rear surface 107 forming the receiving portion 500 can have a shape corresponding to the rear 111 of the second housing 110. In the exemplary implementation illustrated in FIG. 6, the portion 610 of the rear surface includes a recess 605 configured to receive the protruding portion 317 of the second housing, for example, the protruding portion 317 illustrated in FIG. 3. The protruding portion 317 can engage the recess 605 when the electronic device 100 is placed in the first configuration 1000, thereby holding the second housing 110 in place against the first housing 105. Thus, in the first configuration 1000, the engagement between the recess 605 and protruding portion 317 and the exterior positioning of the concealment cover 125 with respect to the front 109 of the second housing enhances the securement of the second housing 110 against the first housing 105 in the first configuration 1000.

In FIG. 6, a coupling edge 620 is formed on the rear surface 107 of the first housing 105. The coupling edge 620 provides a surface to which the concealment cover 125 can be hingedly coupled. While the coupling edge 620 of the rear surface in FIG. 6 is placed along an axis parallel to the coupling edge 106 of the first housing 105, one of ordinary skill in the art will appreciate that the rear surface coupling edge 620 can be formed on the rear surface 107 along an axis that is perpendicular to the coupling edge 106. Additionally, while FIG. 6 illustrates the rear surface coupling edge 620 formed along an axis extending across approximately the middle of the rear surface 107, those of ordinary skill in the art will appreciate that the coupling edge 620 can be formed elsewhere along the rear surface 107 so long as the coupling edge 620 provides an attachment area for the concealment cover 125 to be positioned exteriorly to the second housing 110 when the second housing 110 is received in the receiving portion 500.

In the implementation illustrated in FIG. 6, two hinged portions 615 are formed on the coupling edge 620 of the rear surface 107. While FIG. 6 illustrates two hinged portions 615, those of ordinary skill in the art will appreciate that fewer or more than two hinged portions 615 can be formed on the coupling edge 620 of the rear surface 107. The hinged portion 615 and the coupling edge 620 can define a boundary of the receiving portion 500. Hinge attachment points 200 can be placed in the hinged portion 615. The hinged attachment points 200 can provide attachment points to which a hinge, a pin, a spring-biasing mechanism, or other attachment mechanism attach to provide the hinged or pivoting attachment of the concealment cover 125 with respect to the first housing 105. FIG. 6 illustrates four hinge attachment points 200, but fewer or more hinge attachment points 200 can be implemented. However, FIG. 6 illustrates four points 200 spaced a distance away from the sides 119 of the first housing 105, thereby allowing the sides 119 of the first housing 105 and the sides 117 of the second housing 110 to be co-terminal with one another when the second housing 110 is in the first configuration 1000. It will be appreciated that two attachment points 200 can also be used to allow the sides 119 of the first housing 105 and the sides 117 of the second housing 110 to be co-terminal with one another when the second housing 110 is in the first configuration; however with four attachment points 200, the sturdiness of the concealment cover 125 can be enhanced when the concealment cover 125 supports the first housing 105 against a surface in the second configuration 2000 (as shown in FIG. 3).

Figure 7:
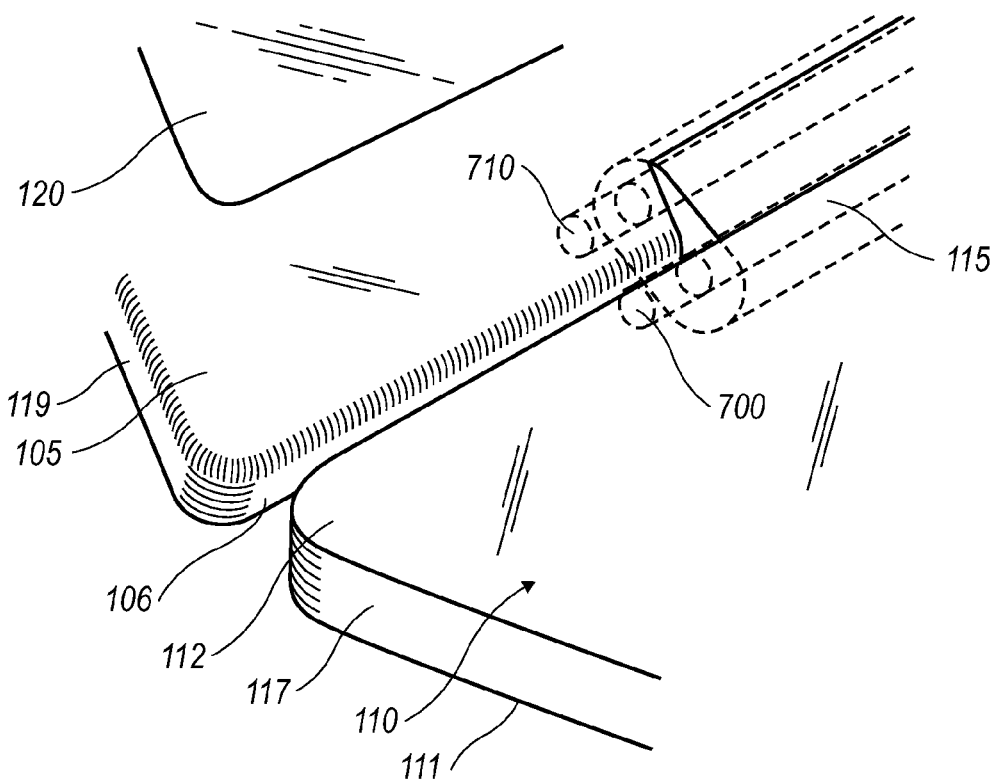
FIG. 7 is a partial front view of the exemplary device having a double-pinned hinge and positioned in the first configuration.
Figure 8:
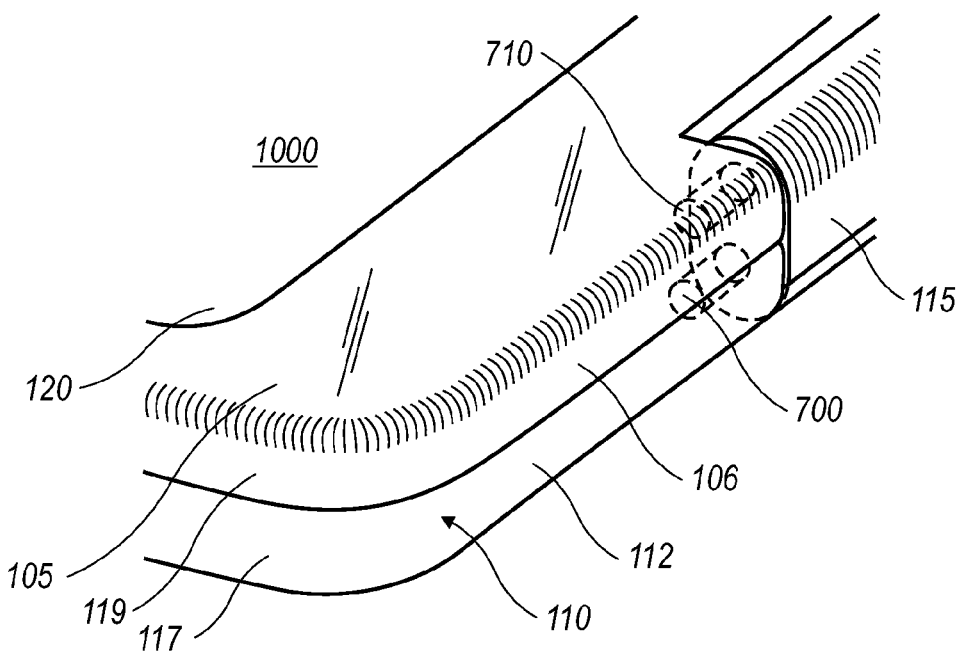
FIG. 8 is a partial front view of the exemplary device having a double-pinned hinge and positioned in the second configuration.

FIGS. 7 and 8 illustrate an exemplary coupler 115 configured to couple the first housing 105 to the second housing 110. FIG. 7 is an illustration of the electronic device in the second configuration 1000 where the front 112 of the second housing 110 is exposed. FIG. 8 is an illustration of the electronic device in the first configuration 1000 where the second housing 110 is concealed by the concealment cover (not shown) of the first housing 105 and whereby the sides 117 of the second housing 110 are co-terminal with the sides 119 of the first housing 105.

As discussed in the previous paragraphs, the second housing 110 is rotatably coupled to the first housing 105. In FIGS. 7 and 8, the coupler 115 that is a hinge rotatably couples the coupling edge 112 of the second housing 110 to the coupling edge 106 of the first housing 105. More specifically, the hinge 115 is a double-pinned hinge. The double-pinned hinge 115 includes a first pin 700 coupled to the second housing 110, and a second pin 710 coupled to the first housing 105. The second housing 110 can rotate about the first pin 700 independently of rotation of the first housing 105 with respect to the hinge 115 via the second pin 710 of the hinge 115. For example, the second housing 110 can rotate about the first pin 700 without rotating the first housing 105 about the hinge 115. Similarly, the first housing 105 can rotate about the second pin 710 without rotating the second housing 110 about the hinge 115. Therefore, the first housing 105 and the second housing 110 are independently rotatable about the hinge 115. In the illustrated implementation, the double-pinned hinge 115 can enhance the co-terminal alignment of the sides 119 of the first housing 105 with the sides 117 of the second housing 110, thereby allowing the sides of the 117 of the second housing to form a portion of the exterior perimeter of the electronic device 100 in the first configuration 1000.

With the electronic device 100 having a concealed keyboard, the familiarity and enhanced functionality of a tactile and full size keyboard can be implemented into a compact device without compromising the size of the display. For example, when the electronic device 100 is an electronic tablet, a full-size keyboard can be implemented to provide the user with the familiarity of a full-size keyboard commonly found on a computing device; however, the large size touch-sensitive display associated with the electronic tablet will not be compromised with the concealed keyboard configuration described herein. The present electronic device 100 having a concealed keyboard eliminates the need to modify or comprise the size of the display screen of the electronic device, while also providing the user with a large or full size keyboard that is suitable for use with two hands. Also, as the sides 117 of the second housing 110 housing the keyboard 305 are co-terminal with the sides 119 of the first housing 105 housing the display screen 120, the length 155 of the second housing 110 can be substantially the same as the length 150 of the first housing 105, thereby providing the user with a large enough housing to house a large keyboard that can be comfortably used by two hands of the user in the second configuration 2000 (for example, the open configuration). Additionally the concealment cover 125 which can form an angle and can be spring-biased to form an angle with the first housing 105 can act as a stand for the display screen 120 housed in the first housing. Therefore, the concealment cover 125 not only protects the keys 310 of the keyboard 305 in the first configuration 1000 but also props up the display screen 120 in the second configuration 2000 thereby allowing the electronic device 100 to operate as a portable or mobile computing device (for example for text entry, word processing, messaging, or the like). Further, the concealed keyboard 305 permits the use of a full keyboard with the large display 120 of the electronic device 100. The concealed keyboard 305 also allows for a less obstructed display 120 when the keyboard 305 is not in use. Additionally, because the keyboard 305 is a physical keyboard 305 and need not be incorporated with a touch screen display 120, the user can experience tactile feedback when entering input into the keyboard 305.

Exemplary implementations have been described hereinabove regarding an electronic device having a concealed keyboard However, one of ordinary skill in the art will appreciate that the concealed keyboard can be implemented on other devices, such as handheld computing devices, PDAs, cellphones, or other mobile devices utilizing keyboard, keypads, or switch panels to input data to the mobile device. One of ordinary skill in the art will also appreciate that the elements and features illustrated in the implementations described and illustrated in the figures herein can be optionally included to achieve the benefits of the presently disclosed electronic device having a concealed keyboard. Additionally, those skilled in the art will appreciate that features in each of he figured described herein can be combined with one another and arrange to achieve the described benefits of the presently disclosed electronic device having a concealed keyboard. Various modifications to and departures from the disclosed implementations will occur to those having skill in the art. The subject matter that is intended to be within the spirit of this disclosure is set forth in the following claims.

What is claimed is:

1. An electronic device comprising:
    a first housing including two outer, peripheral side edges;
    a second housing including two outer, peripheral side edges and being rotatably coupled to the first housing;
    a receiving portion formed in a rear surface of the first housing and configured to receive the second housing and
    a concealment cover coupled to the rear surface of the first housing, wherein the concealment cover is positioned exteriorly to the second housing when the second housing is in the receiving portion;
    wherein when the second housing is in the receiving portion, each of the two outer, peripheral side edges of the second housing is co-terminal with a corresponding outer, peripheral side edge of the first housing.

2. The electronic device of claim 1,
    wherein the first housing comprises a front surface; and
    the electronic device further comprises a display housed in a front surface of the first housing, and a keyboard housed in a front of the second housing and being exposed when the second housing is in an open configuration.

3. The electronic device of claim 2, further comprising a plurality of electronic components housed in the first housing, said plurality of electronic components being communicatively coupled to at least one of the display or the keyboard.

4. The electronic device of claim 2, wherein the keyboard is substantially covered by the concealment cover when the second housing and the concealment cover are in a closed configuration such that the concealment cover is substantially parallel with the rear surface of the first housing.

5. The electronic device of claim 4, wherein the concealment cover is substantially flush with the rear surface of the first housing.

6. The electronic device of claim 1, wherein in a closed configuration, a rear of the second housing faces the rear surface of the first housing and a front of the second housing is covered by the concealment cover.

7. The electronic device of claim 1, wherein the second housing comprises a front, and wherein in an open configuration the front of the second housing is exposed and the concealment cover is rotated such that it forms an acute angle with respect to the receiving portion.

8. The electronic device of claim 1, wherein the rear surface of the first housing comprises a hinged portion coupled to the concealment cover.

9. The electronic device of claim 8 wherein the hinged portion is formed on a coupling edge of the rear surface of the first housing, the coupling edge defining a boundary the receiving portion.

10. The electronic device of claim 1, wherein the concealment cover is hingedly coupled to the rear surface of the first housing.

11. The electronic device of claim 8, wherein the rear surface comprises at least four hinge attachment points to which the concealment cover is hingedly coupled.

12. The electronic device of claim 1, wherein the concealment cover is spring-biased.

13. The electronic device of claim 1, wherein the concealment cover is biased in two directions such that the concealment cover is biased to a closed position and an open position in dependence upon an angle formed with respect to the rear surface of the first housing.

14. The electronic device of claim 13, wherein a spring biases the concealment cover to the closed position if the angle formed with respect to the rear surface is less than half of a maximum angle formed with respect to the rear surface.

15. The electronic device of claim 13, wherein a spring biases the concealment cover to the open position if the angle formed with respect to the rear surface is greater than half of a maximum angle formed with respect to the rear surface.

16. The electronic device of claim 1, wherein the first housing has a coupling edge having a first length, and the second housing has a coupling edge having a second length that is substantially equal to the first length.

17. A keyboard for an electronic device having a coupling edge, two outer, peripheral sides that are substantially perpendicular to the coupling edge, and a concealment cover coupled to a rear surface of the electronic device, the keyboard comprising:
    a housing comprising:
        a front;
        a back opposite to the front;
        a keyboard coupling edge rotatably couplable to the coupling edge of the electronic device;
        two outer, peripheral sides that are substantially perpendicular to the coupling edge of the keyboard; and
        a plurality of keys housed on the front; and
    a coupler configured to couple the housing to the electronic device such that the keyboard has a first configuration in which a rear of the housing faces the rear surface of the electronic device, the plurality of keys face the concealment cover, and each respective outer, peripheral side of the housing and the electronic device are co-terminal with one another.

18. The keyboard of claim 17 wherein the coupling edge of the housing has a length that is substantially equal to a length of the electronic device.

19. A display for an electronic device having a rotatable keyboard having a coupling edge and two outer, peripheral sides substantially perpendicular to the coupling edge, the display comprising:
- a housing comprising:
  - a front surface;
  - a rear surface defining a receiving portion configured to receive the rotatable keyboard;
  - a coupling edge rotatably couplable to the edge of the keyboard; and
  - two outer, peripheral sides substantially perpendicular to the coupling edge;
  - each respective side of the housing and the rotatable keyboard being co-terminal with one another when the rotatable keyboard is received in the receiving portion;
- a display screen housed on the front surface; and
- a concealment cover coupled to the rear surface of the housing, wherein the concealment cover is positioned exteriorly to the keyboard when the keyboard is received in the receiving portion.

20. The display of claim 19, wherein the coupling edge of the display has a length that is substantially equal to a length of the coupling edge of the keyboard.

* * * * *